Figure 4:
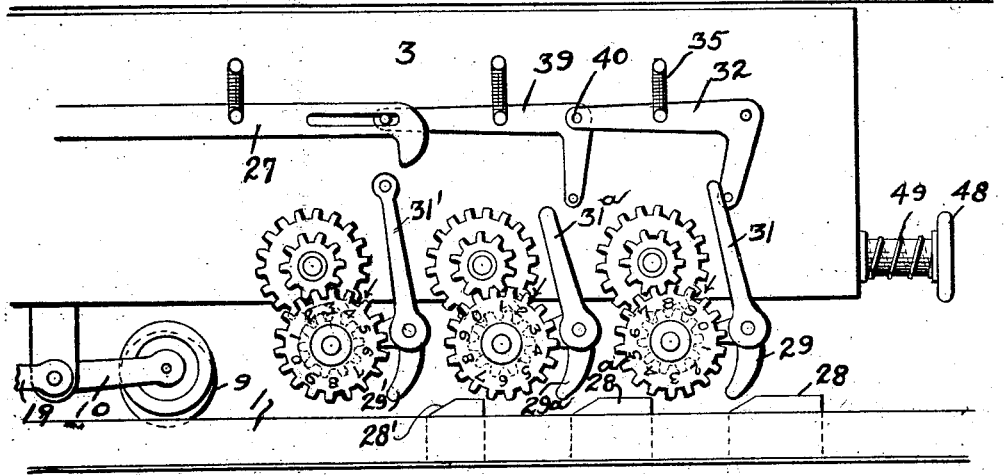

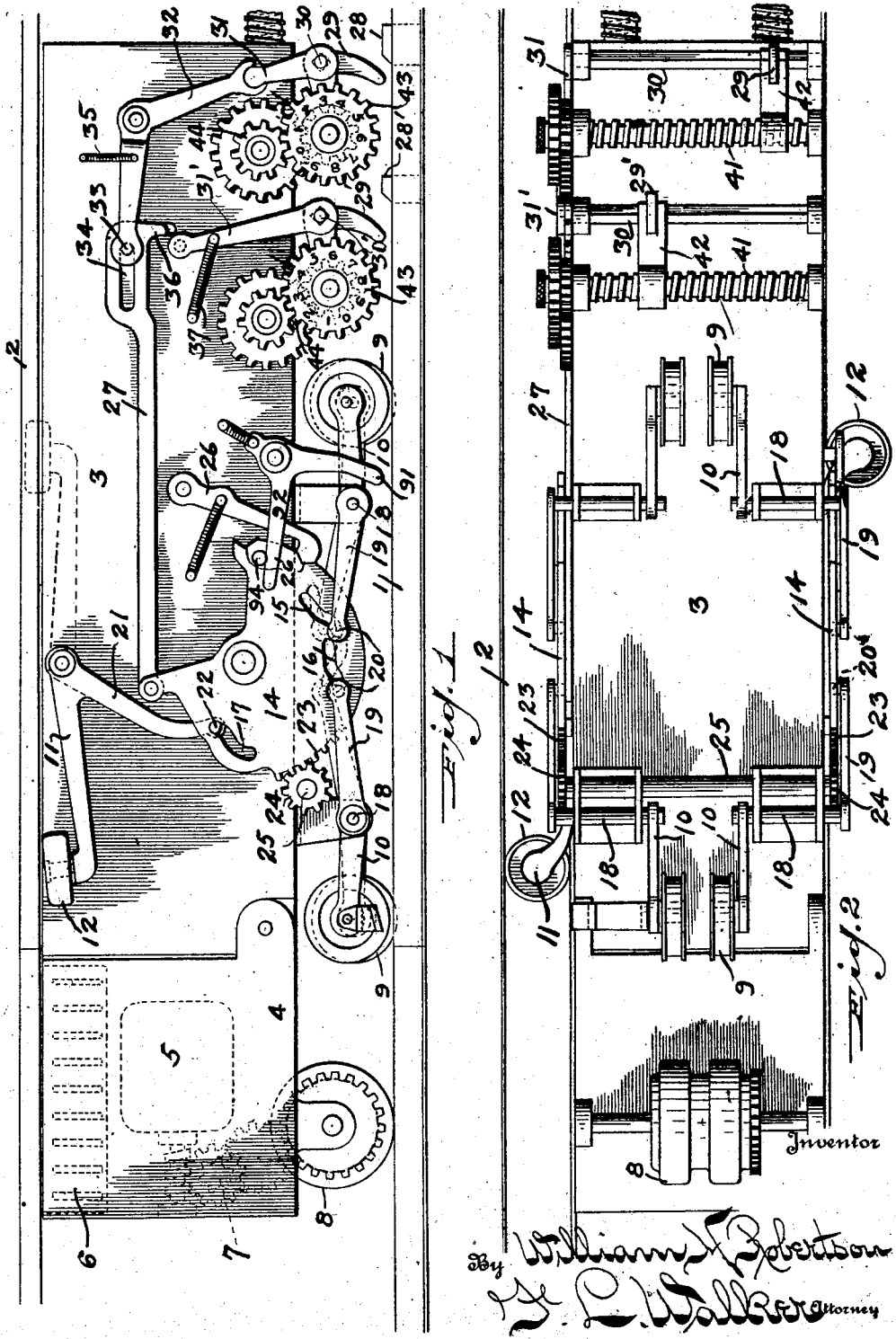

April 19, 1927.
W. H. ROBERTSON
TRAVELING CONVEYER
Filed Feb. 15, 1924
1,625,501
5 Sheets-Sheet 2
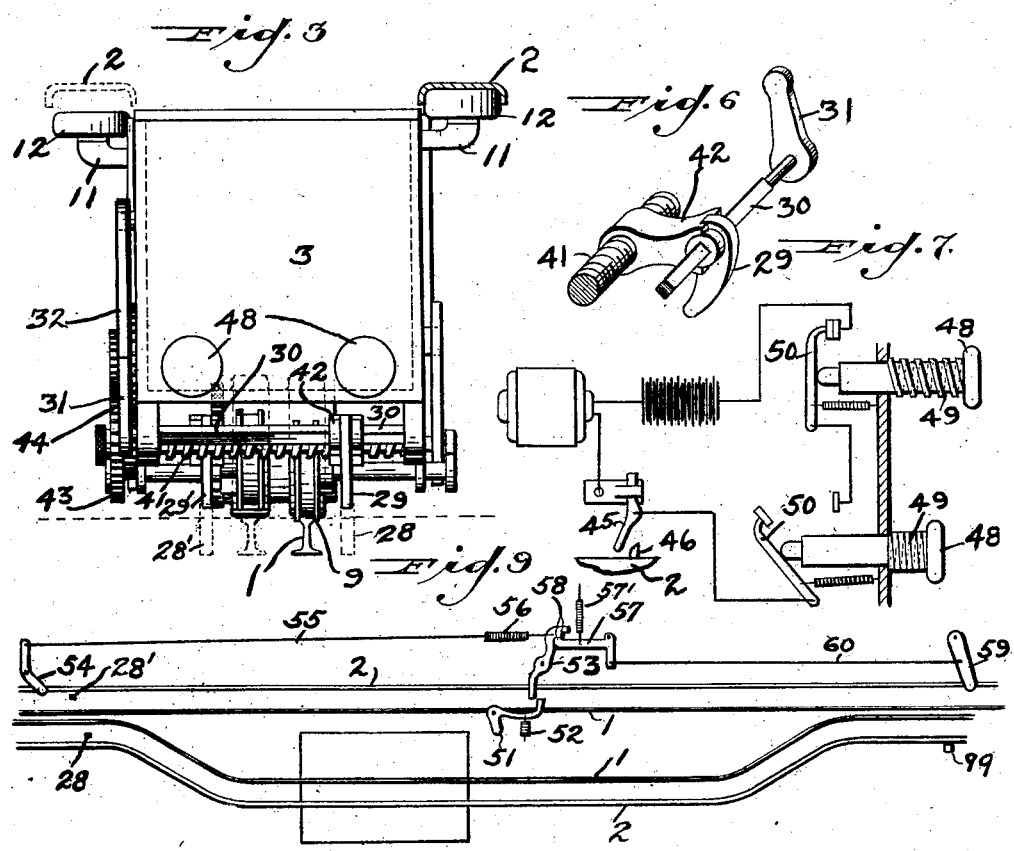
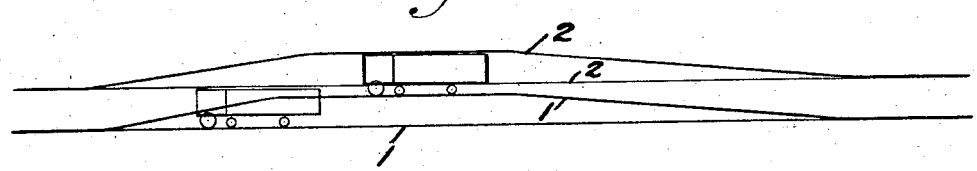
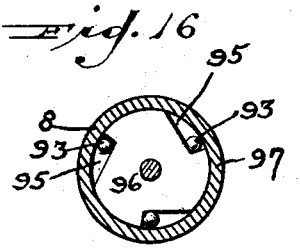

April 19, 1927.                W. H. ROBERTSON                1,625,501
                                TRAVELING CONVEYER
                             Filed Feb. 15, 1924        5 Sheets-Sheet 4
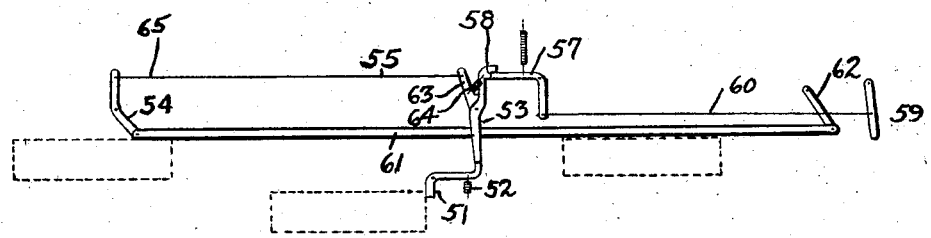
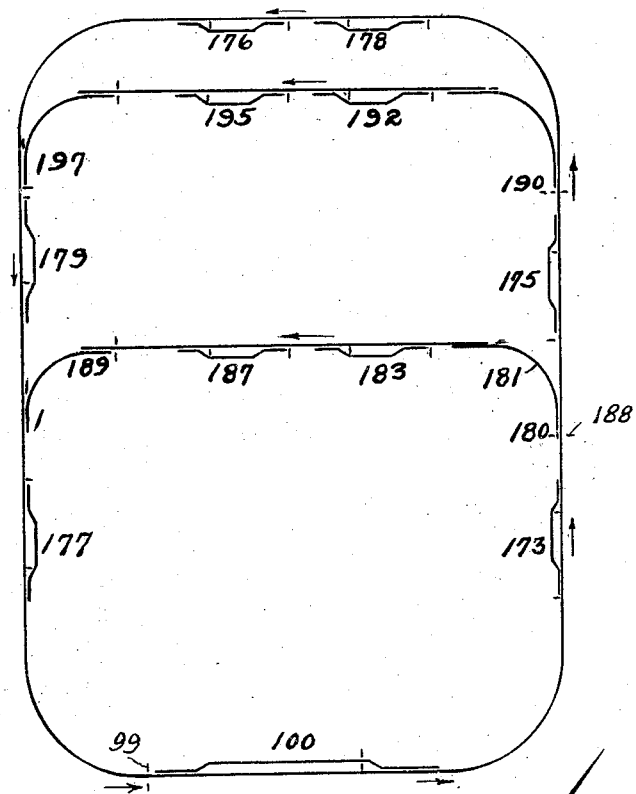

April 19, 1927.                W. H. ROBERTSON                1,625,501
                              TRAVELING CONVEYER
                          Filed Feb. 15, 1924        5 Sheets-Sheet 5
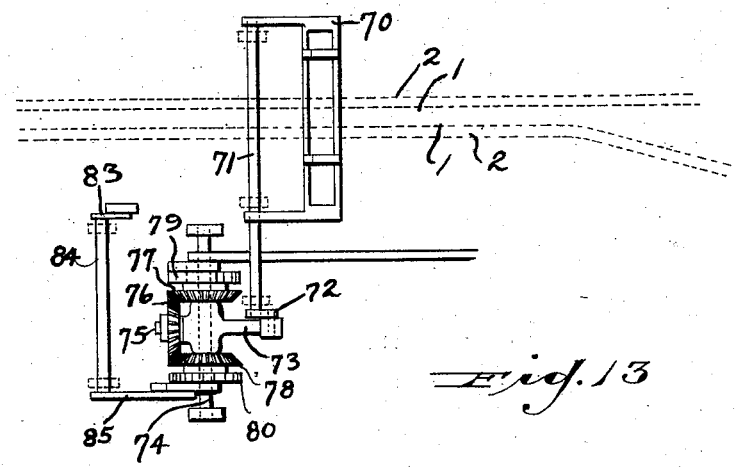
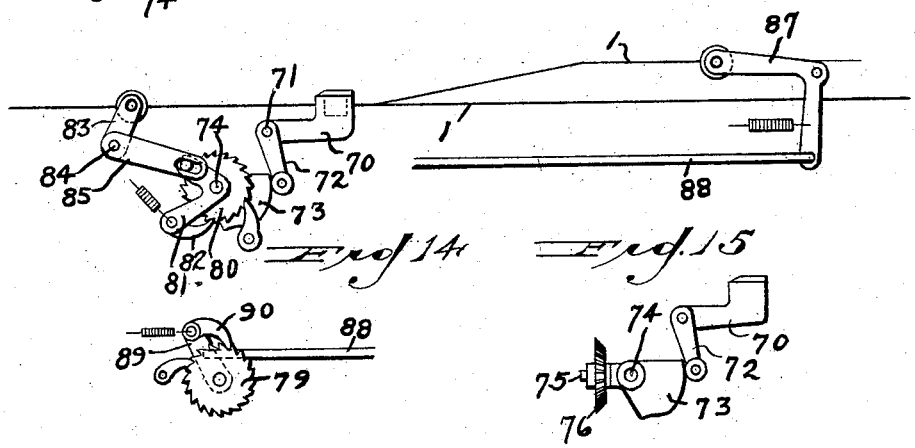
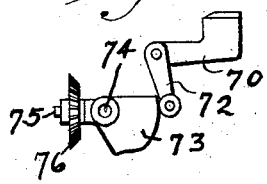
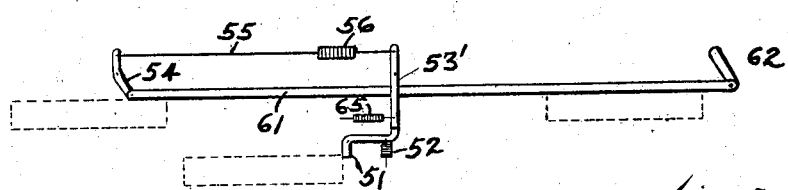
Inventor
William H. Robertson
By H. L. Walker
Attorney Patented Apr. 19, 1927.

1,625,501

UNITED STATES PATENT OFFICE.

WILLIAM H. ROBERTSON, OF DAYTON, OHIO.

TRAVELING CONVEYER.

Application filed February 15, 1924. Serial No. 692,999.

This invention relates to improvements in automatic conveyers and more particularly to an automatic system of car distribution.

The present invention will find a wide range of usefulness in factories, warehouses and the like, for the automatic distribution of materials and supplies from a central supply station to various departments, or to the benches of different workmen in a given department, and for the distribution of freight, and merchandise on wharfs, freight houses or shipping points. It is also contemplated that the present system may be employed for the distribution of cooked foods from a central depot or cooking station to each of a large number of residences or apartments, within an area to be supplied, and to return the empty dishes. The same system might be employed for distributing other merchandise throughout a community, performing the usual function of individual messenger service.

In this invention there is contemplated an automatic conveyer system or a system of automatic car distribution, wherein a series of separate carriers of cars, each operating preferably, though not necessarily under its own motive power, are started from a central station or distributing point for operation over an extended track circuit, and are automatically shunted from the main track or to sidings, at different predetermined stations, in accordance with selective mechanism, carried by the cars or carriers. The selective mechanism may be adjusted or set for any one of a series of stations or stops throughout the system. While the traveling cars or carriers are intended to operate at uniform speed, means is provided for temporarily disconnecting the motive power in the event that one car overtakes another. Car controlled means is provided to prevent the return of a car from a siding to the main track at a time when a second car is approaching within predetermined distance, to prevent interference. Automatic means is further provided in the event that a siding or station track is already occupied to its capacity, any additional cars on which the selective mechanism has been set for a particular siding or station will be shunted onto an overflow siding or will be continued on the main track and returned to the central or distributing point notwithstanding the setting of the selective mechanism. Manually adjustable means is provided, regulating the number of carriers or cars which may be received on any particular siding or station track. Furthermore, means is provided for group selection of cars whereby various cars intended for different stations particularly upon a branch track may be selected as the cars pass a transfer point, and be shunted to such branch track for subsequent selection according to particular destinations. The system provides for practical transportation through long distances of varying loads at irregular intervals under conditions wherein a continuous traveling conveyer would be impracticable.

The invention has been applied to a monorail system. Instead of the usual movable switch point transfer is made from the main line track to sidings or branch tracks, by lowering a second set of carrying wheels into engagement with the siding or branch track, which runs parallel with the main track at the switch point, and raising the main line carrying wheels. This shifting of carrying wheels and consequent transfer of the vehicle from one track to another is effected during the progress of the car by means of trip arms carried upon the cars or carriers engaging with ramps or track positioned stops.

The ramps or station stops are located in different positions transversely in relation with the track rail. The trip arms upon the cars are transversely adjustable in order that they may be positioned to aline with and engage the ramp or stop of the desired station. To increase the range of selectivity or number of stations or destinations, to which a particular car may be directed, the trip arms and station stops or ramps are employed in multiple. That is to say in order to make a selection and transfer the car from the main line track to a siding, it may be necessary that two or more trip arms be operated by their correspondingly positioned ramps or stops. The range of usefulness is thus increased, for whereas one trip arm would enable the selection of only stations 1 to 9, two of such trip arms will permit the selection of stations or destinations to the total of ninety-nine, while an additional trip arm will increase the range to nine hundred and ninety-nine stations.

The object of the invention is to simplify the construction as well as the means and mode of operation of conveyers and distributing apparatus, whereby it will not only be cheapened in construction, but will be more efficient in use, positive in operation, uniform in action, economical in operation, and unlikely to get out of repair.

A further object of the invention is to provide a conveyer system which will be flexible providing for a concentration of moving traffic, eliminating periods of idle operation, and providing for concentration of moving traffic when the necessity arises, or for intermittent operation at more or less extended intervals as occasion may require. By this means the expense of operation and maintenance is directly proportioned to the material conveyed, and is materially less than that of continuously traveling belts, chain or bucket conveyers.

A further object of the invention is to provide a yielding bumper control for the traveling car, whereby a collision between a fast traveling and slow traveling car will automatically but temporarily disconnect the motive power of the car having the greater speed, while the impulse given by such collision will accelerate the speed of the slow moving car, thereby tending to keep the cars in approximately uniform rate of travel.

A further object of the invention is to provide a detent for cars upon a siding and to provide means operated by cars upon the main track and passing the siding or in the vicinity thereof, by which the detent will be locked in car engaging position to temporarily prevent the return of a car from the siding to the main track and in co-operation therewith a trip lever or trigger, set beyond the siding, and operated by the cars passing on the track to release such detent after the main line cars have passed beyond the siding, and there is no longer danger of interference or collision.

A further object of the invention is to provide automatic means for shifting the station stop or ramp out of the path of the selective mechanism on the car traveling the main track when a given siding is filled to capacity, and to further provide for the automatic return of the ramp or station stop to operative position to effect the transfer of additional cars to the siding whenever one or more cars shall have left such siding.

With the above primary and other incidental objects in view as will more fully appear in the specification, the invention consists of the features of construction, the parts and combinations thereof, and the mode of operation or their equivalents as hereinafter described and set forth in the claims.

Figure 5:
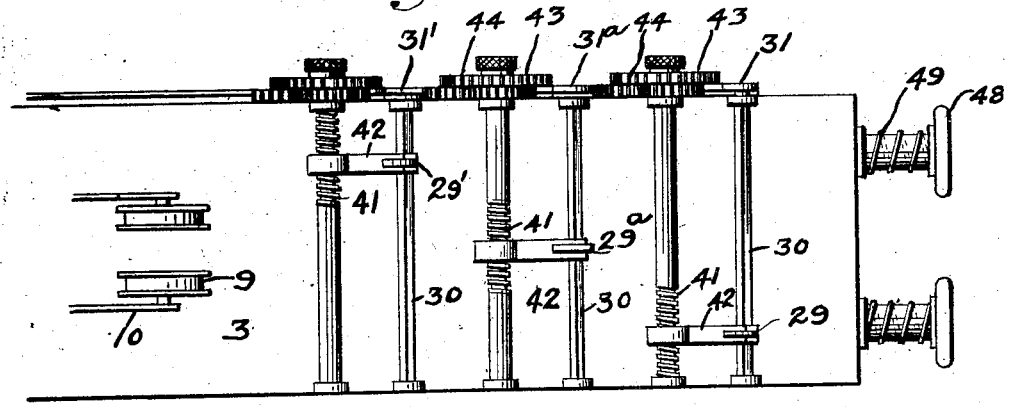

Referring to the accompanying drawings, wherein is shown the preferred but not necessarily the only form of embodiment of the invention, Fig. 1 is a side elevation of a traveling carrier or car, equipped with the selective mechanism for transferring the car automatically from the main line track to a siding and vice versa, at a predetermined transfer point. Fig. 2 is a bottom plan view of the car and equipment shown in Fig. 1. Fig. 3 is an end elevation of the carrier or car shown in Fig. 2. Fig. 4 is a detail side elevation of a portion of a car equipped with selective means operative for an increased number of stations or sidings. Fig. 5 is a bottom plan view of the car and equipment shown in Fig. 4. Fig. 6 is a detail perspective view of the adjustable trip arm for the selective mechanism. Fig. 7 is a diagrammatic view of the motive power control means, by which the power is temporarily cut off in the event of collision by one car overtaking the other. Fig. 8 is a diagrammatic side elevation showing the relative levels of the main track and the siding, the cars entering and leaving the siding upon inclines. Fig. 9 is a plan view of the interlocking detent mechanism, by which cars are retained upon the siding, so long as other cars are passing upon the main track within interfering distance. Fig. 10 is a detail plan view of a modification of this automatic detent control means, and Fig. 11 is a diagrammatic view of a main track and sidings. Fig. 12 is a top plan view and Fig. 13 a side elevation of the automatic regulating means for preventing overcrowding of a given siding. Figs. 14 and 15 are details of the mechanism shown in Figs. 12 and 13. Fig. 16 is a non-reverse mechanism for the driving drum. Fig. 17 is a further modification of the car detent means in a simplified form.

Like parts are indicated by similar characters of reference throughout the several views.

The present conveyer and car distribution apparatus has been illustrated as applied to a monorail system. It is to be understood, however, that it is not so limited, but may be embodied in a double track construction. In the preferred embodiment, the cars or conveyers travel upon the mono-rail track 1, and are supported in upright position and held against lateral tilting movement by engagement of a trolley roller in an elevated channeled trolley guide, 2. It is obvious that the channeled trolley guide 2 may be employed as an electrical conductor, and the cars may be propelled electrically from a central power plant, as in an ordinary trolley car system. However, for economy of operation and to accommodate the system to various conditions of use, each traveling car is preferably though not necessarily individually propelled by a small power plant mounted directly upon the carrier, or car. Such individual power plant may be permanently installed or may be detachably connected as a separable power unit. In lieu of either construction, a locomotive may be employed to propel the cars, singly or in trains.

In Fig. 1, the traveling car or conveyer 3 is shown as provided with a detachable power unit 4. This power unit contains a suitable driving motor 5, operated from storage batteries 6, and transmitting motion through a suitable train of gears 7, to the traction roller or driving drum 8, having traction engagement with the monorail 1. The car 3 is provided with carrying wheels 9, mounted upon oscillatory levers 10 by the oscillation of which the carrying wheels 9 may be raised and lowered out of and into engagement with the track rail 1. There are two sets or pairs of such vertically adjustable carrying wheels. The carrying wheels of each pair are located closely adjacent to those of the other pair or set, and are operated alternately or reversely by common operating mechanism. One pair or set of carrying wheels is positioned to engage and travel upon the main track rail, while the second set when in operative position engage and travel upon the siding or branch line track. The control mechanism is so arranged that after one set or pair of carrying wheels is lowered into engagement with its corresponding track rail, the other set is elevated. Thus the necessity for movable switches is obviated. Each switch track extends for a small distance parallel with the main line track at the transfer point. By lowering the siding or switch track carrying wheels into engagement with such parallel portions of the siding track and then upon further movement of the control mechanism, elevating the main track carrying wheels, the car is diverted onto the siding or branch line track. Each car is further provided with an oscillatory trolley arm 11, carrying a trolley roller 12, engageable in the inverted trolley channel 2. There are two of these trolleys, one on each side of the car, and co-operating with the respective pairs or sets of carrying wheels. The trolleys 11 are oscillated into and out of operative position, in unison with the movement of the carrying wheels and under the control of the same actuating mechanism. Each pair of carrying wheels and its corresponding trolley, are controlled by an oscillatory cam plate, having therein a series of cam slots, there being slots 15 and 16 for the carrying wheels and an additional slot 17 controlling the movement of the trolley. The oscillatory arms 10, by which the carrying wheels 9 are supported, are mounted upon rock shafts 18, which in turn carry rock arms 19, provided at their inner or adjacent ends with studs or rollers 20, which engage in the cam slots 15 and 16 respectively. The trolley 11 is provided with a dependent rock arm 21, provided with a stud or roller 22, engaging in the cam slot 17, of the oscillatory control plate 14. The slots 15 and 16 are so shaped that as the plate 14 is oscillated to and fro, the rock arm 19 and rock shaft 18 will be in turn oscillated to raise and lower the corresponding carrying wheels 9. The cam slot 17 is likewise so shaped that the same oscillation of the plate 14 will correspondingly oscillate the trolley 11. There is a control plate 14, for each set of carrying wheels, and its corresponding trolley. For convenience of illustration, these control plates have been shown located on opposite sides of the car 3. It will be understood that for purpose of illustration the control and selective mechanism has been shown positioned exteriorly of the car or carrier. However, they may also be placed on the interior of the car or otherwise hidden from view. The control plates 14 pertaining to the opposing sets of carrying wheels and trolleys, are operated in unison and are identical, except for the fact that the cam slots 15, 16 and 17 are arranged in reverse relation, so that the movement of the oscillatory plates 14, which oscillates one pair of carrying wheels and its corresponding trolley into operative engagement with the monorail and overhead trolley guide respectively will by a slightly further movement effect the retraction of the opposing set of carrying wheels and trolley. To effect such unison operation the cam plates 14 are provided with a series of marginal gear teeth 23, meshing with a gear pinion 24 upon a transverse gear shaft 25. By this means, the oscillatory movement of one plate 14 is transmitted to the other insuring the operation in unison of the respective sets of carrying and guide elements. The plates 14 are held in either position of adjustment with the carrying wheels and trolley retracted or in operative position by a spring actuated detent 26, engaging in one or the other of marginal notches 26', in the plate 14. The detent 26 does not afford a positive lock, but yieldingly holds the plate in either of its operative positions, from which it may be moved by the selective trip mechanism.

The plate 14 is actuated in one direction by a reciprocatory link bar 27. By the forward movement of the link bar 27 the control plates 14 are operated in unison through their interconnection by the pinions 24 to lower the secondary set of carrying wheels into engagement with the siding track rail and to elevate the main track carrying wheels. This movement of the link bar 27 is effected by the oscillation of a trip arm upon engagement with a track positioned ramp or station stop. In Fig. 1, the link bar 27 has been shown controlled by two independently operated trip arms the operation of both of which is necessary to the movement of the control plate 14. The purpose of the plural trip arms is to increase the range of selectivity, so that the device may be set for operation at a greater number of stations or stops. At each car transfer point, station or siding, are provided one or more track positioned ramps or stops 28, 28'. In Fig. 1 there are shown two such selector operating ramps. Dependent trip arms 29, and 29', are adjustably mounted upon transverse rock shafts 30 and 30'. The dependent trip arms 29 and 29' are keyed upon such rock shafts or as in the present instance, the shafts are polygonal in form so that while each trip arm is adjustable transversely of the car, or longitudinally in relation with the shaft, the shaft and arm must rock in unison. Each rock shaft carries at one end an upturned rock arm 31 and 31' respectively. The rock arm 31 engages in the bifurcated extremity of a pivoted bell crank lever 32, having a stud 33 engaging in a longitudinal slot 34, in the link bar 27. The bell crank lever is normally held in elevated position by a retracting spring 35, against the tension of which it is oscillated by the rocking movement of the arm 31. The bell crank lever 32 and its pin and slot engagement with the link bar 27, normally supports the link bar in an elevated position above the level of the second rock arm 31'. If during the advance of the car, the dependent trip arm 29 engages a ramp or stop 28 in its path of travel, it is oscillated thereby and the rocking movement of the trip arm is transmitted through the rock shaft 30 and rock arm 31, to the bell crank lever 32. This movement depresses the rearwardly extending end of the bell crank lever 32 against the tension of its retracting spring 35, thereby lowering the dependent end or nose 36 of the link bar 27, into the path of movement of the second rock arm 31'. If before the dependent trip arm 29 passes off its engaged ramp 28, the second trip arm 29' engages the ramp 28', the arm 31' will be oscillated against the tension of its retracting spring 37, and by its engagement with the dependent nose 36 of the link bar 27, it will carry the link bar forwardly with it, thereby transmitting an oscillatory movement to the control plate 14. If, however, the secondary ramp 28' and trip lever 29' are not relatively positioned for interengagement and no oscillation of the rock arm 31' occurs, the bell crank lever 32 and with it the link bar 27, will be returned upwardly to their normal position by the retracting spring 35, without the bar and control plate having been operated. In such case the oscillation of the primary trip lever 29 will have been idle. Likewise if the primary ramp 28 and trip lever 29 are positioned out of registry so that they do not interengage at a particular station or siding, but the second ramp 28' is positioned for engagement and is engaged by the secondary trip lever 29', the result will be merely an idle operation of the rock arm 31' against the tension of its retracting spring 37, and no movement of the bar 27 and plate 14 will occur. The function of the initial trip lever 29 is merely that of setting the selective mechanism for operation by the engagement of the second trip lever with its corresponding ramp. If as before stated, the mechanism is set and no operative action of the operating arm 31' occurs, there will be no response of the mechanism. To the contrary if the operating arm 31' is oscillated and the mechanism has not been set for the interconnection of such arm with the link bar 27 by the prior operation of the setting trip arm 29, the mechanism will not respond. It is only when both trip arms are operated, first the arm 29 to set the mechanism, and second the arm 29' to shift the link bar that the alternation of the carrying wheels and trolleys occur. Obviously if only a few stations or sidings are involved in the system, the link bar 27 might be permanently connected with or projected into the path of movement of the operating rock arm 31', and the bell crank lever 32 and setting trip arm 29 might be entirely omitted. If, however, a very large number of stations or transfer points is contained in the system, additional setting arms may be provided as shown in Fig. 4. In Fig. 4 there is shown an additional dependent trip arm 29$^a$ positioned intermediate the setting arm and actuating arm as shown in the preceding figures. The initial setting arm 29 by its engagement with the primary ramp operates to oscillate the bell lever 32 as before described. However, in Fig. 4 the bell lever 32 instead of being connected with the link bar 27 is connected to an intermediate bell lever or L-shaped link 39, pivoted at 40 to the primary bell lever 32. This intermediate lever 39 has the same pin and slot connection with the link bar 27 as before described. The operation is that previously described and consists in the oscillation of the primary bell lever 32, by the movement of the rock arm 31, upon engagement of the primary setting arm 29 with its ramp 28. This movement of the bell lever 32 lowers the intermediate link or lever 39 into the path of the intermediate rock arm 31$^a$. Upon the engagement of the second or intermediate setting trip arm 29$^a$ with its corresponding ramp 28$^a$, the second bell crank lever 39 will be oscillated about its pivotal connection 40 upon the previously operated bell crank lever 32. This oscillation of the lever 39 will lower the dependent nose 36 of the link bar 27 into the path of the actuating rock arm 31', and upon engagement of the actuating trip arm 29', with its ramp 28', the link bar 27 and control plates 14 will be operated.

The different ramps or station stops are located in distantly spaced relations transversely of the track rail. The dependent trip arms as before described are slidingly adjustable upon their rock shafts, to adjust them into and out of registry with different distantly positioned ramps or stops. In order to slidingly adjust the trip arm upon the rock shaft, transversely arranged adjusting screws 41 are provided, each of which carries a yoke or shift arm 42, which embraces the corresponding dependent trip arm 29. As the yoke or shift arm 42 is adjusted to and fro by the rotation of the screw shaft 41, it carries with it such trip arm to different positions upon its rock shaft 30. To facilitate the adjustment of such trip arms into alinement with predetermined ramps or stops, an adjusting dial or index head is provided for each screw shaft 41. Such index head or dial 43 is preferably connected with the screw shaft by a chain of gears 44, in order that one rotation of the dial or index hand may transmit to the screw shaft sufficient rotation to propel the yoke or shift arm 42 and with it the dependent trip arm throughout the entire range of its movement, transversely of the car. Obviously, the adjusting screws 41 may be directly operated without the intermediate gear train thereby necessitating successive complete rotations to adjust the trip arms transversely throughout their range of movement. However, by employing the gear train whereby a single rotation of the index head or dial will effect succesive rotations of the screw, the dial or adjusting head may be numbered, and the different trip arms set to different combinations, to agree with the positions of the ramps or stops at different stations or car transfer points. Assuming that there may be ten different positions transversely of the track rail in which the ramps may be set, for instance, five positions on each side of the track rail at different distances therefrom, the indicator heads or dials would be numbered from nought to nine. By turning the index head or dial to register the different numbers with an indicator mark or pointer, the trip arms may be adjusted transversely in predetermined positions corresponding to the different relative positions of the ramp. For instance, if a station or transfer point is given the number 73, one of the ramps, for instance that engaged by the setting arm 29 would be positioned in the third position, while the other ramp to be engaged by the operating trip arm 29' would be located in the seventh position. Therefore, by setting one of the index heads or dials to seven, thereby positioning the actuating trip arm 29' into alinement with one of the ramps, and adjusting the other index head or dial to the third position to correspondingly set the setting trip arm 29 into alinement with the other ramp, whenever the car reaches such transfer point, and the two ramps are engaged, the carrying wheels and trolleys will be alternated, as before described. While these trip arms will be oscillated by their engagement with ramps in similar positions at other stations, as long as such ramps are not in the same relative relation, or the same combination of positions, to cause the operation of both trip levers, the mechanism will not be operated to reverse the carrying wheel.

As before stated, the terminal of each siding or branch line track extends for a short distance parallel with the main track. These station stops or operating ramps are located contiguous to such parallel portions of the siding. Such track arrangement is illustrated in Figs. 8 to 11 inclusive. The carrier or car travels the main line track upon two of its carrying wheels, and with one of its trolleys engaged in the elevated channel guide. Upon the engagement of its dependent trip arms with the station stops or ramps, the control plate 14 will be oscillated to alternate the carrying wheels and trolley. Such shifting mechanism for the carrying wheels is shown in detail in Figs. 1, 2 and 3. This alternation occurs while the car is passing the parallel terminal of the siding. The cam slots 15, 16 and 17 in the control plate 14 are so shaped that momentarily the car will be riding upon both sets of carrying wheels, and both trolleys will be held in engagement. Upon the completion of the movement of the plate 14, the main track carrying wheels and trolley are retracted and the car continues its travel upon the second set of wheels, engaged with the siding rail, and is so shunted off the main track onto the siding. The sidings are preferably elevated somewhat above the level of the main track so that the car shunted onto the siding by the alternation of its carrying wheels will travel up an incline and so arrest its momentum. As the car enters the siding, its motive power is disconnected. This is preferably by opening a switch in the electrical distribution line to the motor. Such switch is shown at 45 in Fig. 7. The switch is carried upon the car in position to engage a projection or lug 46 located beside the track or preferably upon the elevated trolley guide 2. The engagement of the switch arm 45 with such stop as the car is shunted onto the siding disconnects the motor and the momentum of the car is absorbed by the inclined approach to the siding. The traction or driving drum 8 is sufficiently broad to simultaneously engage both the main track rail and the siding rail through the contiguous parallel portion, so that such driving drum passes from one rail to the other, easily and smoothly without interference.

While it is intended that all of the cars operating over the system shall be propelled at approximately the same speed, the rate of travel of different cars may vary somewhat according to the loading, the deterioration of the car, or due to mechanical difficulties. The cars are all routed in the same direction. However, a slight variation of speed of two closely traveling cars may cause one of the cars to overtake the other. The cars are equipped with depressible or yielding spring bumpers 48, depressible inwardly against the tension of springs 49. These bumpers have operative engagement with switches 50 in the current distributing circuit to the driving motor. A rear end collision between two traveling cars will cause the depression of the yielding bumpers of the faster and rearward car, thereby opening the motor circuit and temporarily cutting off the motive power to such car. At the same time the push or momentum transmitted to the forward car will tend to accelerate its speed. Upon separation of the cars, the depressed bumpers will be retracted and the circuit switches will automatically close, reestablishing the motive power.

In order that a car may not leave a siding and return to the main track at a time when it will interfere with other cars passing upon the main track, a special car detent is provided at each siding or station stop. Several different methods of controlling the detent have been shown in Figs. 9, 10 and 17. In each instance, there is provided a pivoted stop lever 51, normally yielding against the tension of a retracting spring 52, to permit the movement of a car from the siding. The stop lever 51 extends into the path of travel of a car, leaving the siding. Normally the moving car will merely push the stop arm 51 aside, and upon the passage of the car, the spring will retract the arm into position for engagement with the next car. However, if a car is within interfering distance upon the main track, a lock arm 53 is oscillated into the path of movement of the detent arm 51, and so locks the detent arm against the movement out of the path of travel of the car. In Fig. 9 the locking lever 53 is actuated from a distant point by means of a trip arm 54, pivoted in such position as to project into the path of travel of cars passing upon the main line track. This trip arm 54 is connected by a cable, wire or other means 55, with the locking lever 53. A tension spring 56 is preferably interposed in such connection 55 to prevent breakage and compensate for inaccuracies of adjustment. A pivoted spring actuated detent 57 is provided for the locking lever 53. When the locking lever is oscillated by the operation of the trip arm 54 into its locking engagement with the car detent 51, the lever detent 57 will be actuated into engagement with the stop shoulder 58 by the spring 57', to hold the parts in such adjusted position and maintain the car detent 51 against retraction, until the main line car has passed beyond the siding exit. At the outlet of the siding, is a second trip arm 59, connected by a strand or cable 60 with the lever detent 57. As the car passes such releasing trip arm 59, it will oscillate the arm and transmit motion through the strand connection 60, to disengage the locking detent from the shoulder 58, thereby permitting the locking lever 53 to move out of engagement with the car detent arm 51, whereupon cars may pass such detent from the siding and return to the main line track.

The construction shown in Fig. 10 is quite similar except that the operating engagement of the main line cars is made through a parallel bar 61 connected at one end to the trip arm 54, and at its opposite end to a corresponding swinging arm 62. So long as a main line car is in the danger zone, it will hold the parallel contact bar 61 pressed laterally, and so hold the trip arm 54 and locking arm 53 in operated position. The same type of lever detent 57 and releasing trip 59 are employed as previously described and shown in Fig. 9. In lieu of providing a yielding tension link 56, in the connection 55 between the trip arm 54 and locking lever 53, the locking lever is provided with an auxiliary concentrically pivoted arm 63, connected to the main locking lever by an intermediate spring 64. It will be understood that the resistance of the spring 64 as well as the tension link 56 of the previously described construction is greater than the normal resistance of the locking lever 53. It is only after the lever has been moved to its operative position that any pull upon the operative mechanism is compensated for by the yielding of the tension link 56 or the intermediate spring 64. In Fig. 17, this car detent control mechanism, has been simplified and has been shown as a simple locking lever 53', controlled by the parallel bar 61, carried by the oscillating trip arm 54 at one end and swinging arm 62 at its opposite end. So long as a main line car is within the danger zone, it will hold the bar pressed laterally and therefore, hold the locking lever 53' in its operative position, and engaged with the car detent 51. Whenever the car passes beyond the parallel bar 61, the retracting spring 65 will return the parts to normal relation. While either of these constructions will operate successfully and practically, the parallel bar operating means of Figs. 10 and 17 is to be preferred. The construction shown in Fig. 9 is quite satisfactory and desirable, providing the cars are not routed closely together. In normal operations, the cars will not follow one another so closely, that more than one car would be in the danger zone adjacent to a siding, at the same time. However, such condition might arise in emergency or through accidental disarrangement of the schedule. If two cars happened in the danger zone, that is, intermediate the initial trip arm 54 and the release arm 59, as shown in Fig. 9, the first car to leave such zone would operate the release trip 59, and unlock the car detent 51, permitting a car to leave a siding, and perhaps collide with the second car in such zone, which may have passed the setting trip 54, before the first car operates the releasing detent trip 59. By the use of the parallel bar control shown in Figs. 10 and 17, the car detent 51 will be held in locked position so long as any car remains within the danger zone, or until the last car has moved beyond the exit of the siding.

To prevent overcrowding of a siding and to by-pass cars on the main track, in the event a siding is filled to capacity, the ramps or stops 28 may be located upon a depressible frame or carrier as shown in Figs. 12 and 13. In this construction a swinging carrier frame 70 extends transversely of the track and is mounted upon a rock shaft 71.

At its extremity shaft 71 carries a rock arm 72, normally engaging an oscillatory cam 73, by which the swinging frame is oscillated and held in its elevated position. The cam 73, is mounted for oscillation upon a supporting shaft 74, and carries upon a laterally projecting stud 75, a bevel gear pinion 76, meshing with two corresponding pinions 77 and 78, also mounted upon the shaft 74 concentric with the pivotal mounting of the cam 73. Fixedly connected to each of the gear pinions 77 and 78, are ratchet wheels 79 and 80 respectively. These ratchet wheels 79 and 80, however, are arranged with their ratchet teeth turned in opposite directions. Pivoted upon the shaft 74 adjacent to the ratchet wheel 80 is a pawl arm 81, carrying a driving pawl 82, engaging the teeth of the ratchet wheel. Extending into the path of travel of the cars upon the siding track is an oscillatory rock arm 83, to be depressed by a passing car. This rock arm 83 is connected through a rock shaft 84 and a second rock arm 85, with the pawl arm 81. The construction is such that the depression of the rock arm 83 by a passing car will transmit motion to the pawl arm 81 to advance the ratchet wheel 80 a partial rotation. The ratchet wheel being directly connected with the gear 78, transmits the same partial rotation to said gear. The gear being in mesh with the intermediate gear 76 rotates the gear upon its stud 75. However, the gear 76 being in mesh with the gear 77 which during such time is stationary, the intermediate pinion 76 will travel upon the gear 77 as upon a rack, thereby giving to the cam 73 an upward partial rotation. The parts are so proportioned and the rate of travel so adjusted that each car entering the siding advances the ratchet wheel through an additional partial rotation or step. Every time a car enters a particular siding, its engagement with the depressible arm 83 actuates the ratchet wheel 80 one step or tooth to correspondingly advance the oscillatory cam 73. Likewise every car leaving the siding by its engagement with the lever 87, actuates a corresponding ratchet wheel 79 one step or tooth to retract the oscillatory cam 73. Thus for every car entering the siding, the cam is advanced one step toward the point where it releases the ramp carrier 70, and for every car leaving the siding, the cam is set back one step from its operating point. Consequently it is only when the advance steps of the cam corresponding to the entrance of a car to the siding exceeds the number of outgoing cars and retrograde steps of the cam, that the cam can reach the point where it releases the depressible ramp carrier. When this point is reached, the ramp carrier 70 being depressed, any additional cars set for such siding will not be tripped but will continue on the main track back to the starting point. The last car which the siding is capable of receiving will have advanced the cam 73 beyond the point of engagement of the rock arm 72, thereby allowing the rock arm and with it the swinging ramp frame 70 to swing downward. This withdraws the station ramp from the path of travel of the cars upon the main track and any additional cars set for the particular siding will be bypassed or continued on their main line journey. Such construction is clearly illustrated in Figs. 12 to 15 inclusive.

As a car leaves a siding it will engage a second depressible lever 87, connected by a rod or link 88, with a pawl arm 89, carrying an actuating pawl 90 for the ratchet wheel 79. As before mentioned, the teeth of this ratchet wheel 79 are turned in reverse direction, and the depression of the lever 87 rotates such ratchet wheel through a partial rotation in a direction opposite to the direction of the initial ratchet wheel 80. This movement is transmitted through the gear 77 to the intermediate pinion 76, which meshing with the gear 78 as a rack will cause a reverse oscillation of the cam 73 or downwardly. It will be understood that the car regulating mechanism is controlled by a step by step movement operated in one direction by the entrance of cars onto the siding, and set back step by step as each car leaves the siding. Thus each car leaving a switch or siding retracts the depressible ramp control cam one step, which it has been advanced by the entrance of a car onto the siding. It is only when the siding is filled to capacity and the mechanism has been advanced through successive steps, to the point upon the cam where the rock arm is permitted movement to allow the ramp to be lowered, that additional cars will be bypassed, upon the main track. Such bypassed cars, for which there is no available room upon a siding, may continue their journey about the track system and return to the starting point, or an emergency or overflow siding may be provided at each station having ramps or stops positioned like those of the main siding, so that any bypassed cars for which no space is available upon the main siding may be diverted onto such emergency or overflow siding. At the transfer point or branch line track, are located groups of ramps or station stops, occupying positions corresponding to all the different individual stations or sidings, upon such branch line. In those cases wherein a branch line or branch track contains several sidings, there will be at such transfer point from the main line to the branch track, station ramps corresponding to all of the sidings upon such branch track so that all of the cars set for such siding of such branch track will engage one or another of the ramps at such point and so be transferred from the main line to the branch track. At each of the individual sidings on the branch track will be corresponding station ramps by which the cars set for such sidings will be again transferred from the branch track to the siding. That is to say, the cars directed to sidings upon the branch track are twice transferred. All of the cars are transferred from the main track to the branch track, which necessitates a series of differently positioned ramps, one for the cars directed to each of the sidings on such branch track. Subsequently, the cars thus transferred to the branch track are retransferred from the branch track to the siding by engagement with a ramp which corresponds to one of the several ramps at the branch track transfer point. Thus a number of cars, the selective mechanism of which has been set for different individual stations on the branch line will be automatically transferred at the common transfer point. Such cars will be subsequently again selected and diverted to their individual sidings upon the branch track.

In Fig. 11 there has been shown diagrammatically a track circuit including several branch lines, or shunts, having individual sidings thereon. The different sidings or stations have been given numbers, which intentionally have been arranged non-consecutively, to indicate that it is not necessary that the station numbers be arranged in any particular sequence. In the present instance, the central station or distributing point has been indicated at 100. Referring to the diagram Fig. 11, the siding 100 is assumed to be the starting point or home station. At this point there is provided a continuous ramp common to all the carriers; extending the full width of the path of operation. The purpose of this is to effect the transfer of every car from the main line to the home station siding, no matter what the setting of its particular selective mechanism may be. It will be understood, however, that at this central station siding, there will be a ramp entirely across the range of operation, so that every car, no matter how the selective mechanism may be set, will engage some portion of the general ramp and will be diverted to the main station siding. The first individual station has been numbered 173. At this station one of the track ramps will be set in the first position, another in the seventh position, and the other in the third position, so that only cars having their shift levers in corresponding positions by the setting of the dials or index head to the figures one, seven and three will be diverted at this station. The transfer point is indicated at 180. This is a transfer point for a branch line, on which station numbers 183 and 187 are located. Consequently the ramp or station stop at the point 180 will be set in position to correspond to all of the stations upon the branch line, that is, in this particular instance the ramps will occupy the eighth, seventh, third and first positions. Consequently, all cars set for stations 183 and 187 will engage corresponding ramps at the transfer point 180, and will be diverted to the curved siding 181. At the end of this siding they are transferred back to the branch line track as at any individual siding. At the siding 183, will be ramps set in the first, third and eighth positions, and all cars having trip levers correspondingly set will be diverted, while those having trip levers set for the siding 187 will pass by and will enter the siding 187. At the point 188 there will be another group of ramps common to all the branch line stations by which the cars entering upon the branch line 180 will be transferred to the siding 189, from which they will be transferred back to the main line track at the end of such curved siding. It is assumed that each carrier is provided with three adjustable trip arms corresponding to units, tens and hundreds of the station numbers. In the diagram 11, on the first branch track, which contains the stations 183 and 187, it will be necessary to provide at the point 180, where such branch track leaves the main line, sufficient ramps to operate the trip arms for both sidings 183 and 187, that is to say, to operate such trip arms the first, third, seventh and eighth positions. These ramps at 180 will transfer the cars from the main line to the curved line 181, from which they are retransferred by a common ramp to the transverse portion of the branch track. From this they are transferred individually at the respective sidings.

As the cars leave the sidings 183 and 187, they are automatically transferred to the branch track. Since each carrier has two sets of carrying wheels, it is necessary to reverse these carrying wheels at the point 188 so that all of the cars from both sidings 183 and 187 may pass on to the curved track 189 and then the carrying wheels must be again reversed to place the proper carrying wheels on to the main line track. This is effected by a series of common ramps similar to those at the point 180, so located as to be engaged by not only the cars set for the siding 183, but also for those set for 187, both of which must be transferred from the branch track to the main line, for their return. The cars having their trip levers set for stations 175, 178, 176 and 177 will pass by the transfer point 180 and also pass the transfer point 190, and will be diverted to their respective sidings in accordance with the setting of their trip levers. At the point 190, another common ramp group will be arranged to engage the trip levers for all cars set for the stations upon the branch line track leaving the main line at the transfer point 190. These cars will be distributed to the individual sidings 192 and 195, and upon their return will be retransferred to the main line track through the curved siding 197.

In transferring a car from a siding or station track back to the main line track, it is of course necessary to reverse the relation of the carrying wheels and trolleys. In entering a siding, this transfer is effected through the selective mechanism. However, no selection is necessary when a car leaves the siding to return to the main track. It is necessary, however, that the control plate 14 be oscillated in reverse direction. Such reverse oscillation lowers the main carrying wheels 9 into engagement with the main track rail, and by a continued movement elevates the auxiliary or siding track carrying wheels and at the same time alternates the trolleys. To effect such reversal, there is a track positioned ramp 99 positioned to be engaged as a car approaches the siding exit. These exit ramps or stops are in the same identical position at the outlet from each siding. Pivoted upon each car is a bell crank lever, one arm 91 of which extends downwardly for engagement with such exit ramp. The other arm 92 of the bell crank lever extends into proximity with a lug or stud 94 upon the oscillatory control plate 14. As shown in Fig. 1, the engagement of the dependent arm 91 with such exit ramp will oscillate the bell crank lever which movement is transmitted through the arm 92 and the stud or pin 94 to effect a reverse oscillation of the control plate and consequently a reversal of the carrying wheels and trolley.

As before mentioned the motive power of each car is shut off by the opening of a switch in the electrical power circuit as the car enters a siding. As also stated, the siding entrance is inclined upwardly to absorb the momentum of the car. The grade and length of such inclined portion of the siding is so designed as to bring the car to rest at the top of the incline or on the horizontal portion of the elevated siding. However, to prevent a car from running backward, in the event that its momentum was insufficient to carry it over the incline, the driving drum 8 is preferably provided with a suitable reverse clutch, which will permit free rotation of the traction or driving drum so long as the car moves forwardly, but will automatically engage upon reverse movement of the car to prevent retrograde movement. A simple type of such clutch has been shown in Fig. 16, wherein a series of clutch balls 93 are located in peripheral notches 95 in a stationary disc 96, within a rotating flange 97 upon the driving drum. So long as the drum flange 97 rotates in the forwardly direction, the clutch balls will remain in the deep portion of the notches. However, upon reversal of the direction of rotation, the tendency of the balls is to pass into the shallow or narrow portion of the notches and become wedged between the inner circumferences of the flange 97 and the disc. Such construction is an ordinary form of reverse operated clutch, and is shown and described for illustrative purposes only, it being understood that other forms of non-reverse mechanism may be employed.

It is not thought necessary to describe the various applications of the invention. The mention of a single instance will suffice to indicate the general mode of operation. The system might be installed for the distribution of supplies in a factory. Cars might be loaded at a central point with foundry sand for distribution to different molding floors. Other cars might be loaded with castings for distribution throughout the machine shop. Still other cars might be loaded with lumber for the wood-working department. A separate siding might be provided for each molding floor, for each machine, or group of machines, or for each workman's bench, or for a department as would be most practical and convenient. All the stations to which like material is to be distributed might be given the same identification number. For instance, there might be a number of molding floors, each with its individual siding for cars of molding sand, but all numbered the same. Likewise, stations receiving castings, or those receiving wood for similar operations would be known by the same identification numbers. Cars would be loaded at a central distributing point and started on their journey. Those cars loaded with molding sand reaching the first molding floor siding would enter if the siding was empty, or had additional space for more cars. If, however, the first molding floor station was fully supplied with sand, the loaded cars would be by-passed to the next station, which they would enter if space was available or sand needed. If the second siding was found to be fully occupied, such loaded cars would continue until an empty siding was found.

If all of the sidings were full and all the molding floors fully supplied with molding sand, these cars would continue around the track circuit and return to the supply point. The same thing would occur with cars loaded with castings, or with lumber to the machine shop or wood working department respectively. So long as a loaded car returned occasionally to the starting point or distribution station, the car dispatcher would know that all the stations requiring their particular kind of material were fully supplied. Obviously, if there was available space at any of the series of stations identified by like numbers and using the same class of materials, the loaded car would find entrance to one siding or another, and would not return in loaded condition to the starting point. If, however, no loaded car returned to the starting point for a predetermined period, the dispatcher will know that cars of that particular sort of material were needed.

If a locomotive were pushing uncoupled cars each would automatically leave the train and enter the siding for which it had been adjusted.

Having thus described my invention, I claim:

1. In an automatic conveyer system, a plurality of independent traveling carriers, a circuitous track system including main line track and sidings, alternating sets of guide means engageable with the main line track and sidings respectively, the transfer from main line to siding track and vice versa being effected by operatively engaging one set of guide means and retracting the other, means for automatically transferring carriers from the main line track to a siding at a predetermined transfer point by alternation of the guide means including track located trip means located in differently spaced relation transversely to the path of travel and transversely adjustable selective mechanism located upon each carrier and adjustable transversely of the path of travel for engagement with the trip mechanism at any one of a plurality of transfer points throughout the system whereby the selective mechanism will idly pass certain trip means and be operatively engaged with only the trip mechanism for which it has been previously adjusted.

2. In an automatic conveyer system, a plurality of independently traveling carriers, a circuitous track system including main line track and sidings, alternating sets of guiding means upon the carriers engageable with the main track and siding track respectively, selective mechanism upon the carriers and trip means for operating the selective mechanism upon different carriers to alternate the guiding means at predetermined points by which such carriers are automatically shunted to different sidings, and trip means common to the selective mechanism of all the carriers by which each carrier will be automatically shunted onto a common siding additional to the particular siding for which said selective mechanism is ordinarily operative.

3. In an automatic conveyer system, a plurality of independently traveling carriers, a circuitous track system including main line track and sidings, two sets of carrying wheels alternately operative upon the main line track and siding, selective mechanism upon the carriers and trip means for operating the selective mechanism upon different carriers at predetermined points to alternate the carrying wheel by which such carriers are automatically shunted to different sidings, said trip mechanism at a particular siding being common to the selective mechanism of a plurality of such carriers but not to other carriers traveling the system.

4. In an automatic conveyer system, a plurality of independent traveling carriers, a circuitous track system including main line track and sidings, mechanically operated selective mechanism upon the carriers and trip means for mechanically operating the selective mechanism at different sidings, such trip mechanism being common to a plurality of carriers for shunting such plurality of carriers from the main line track at a particular transfer point, such selective mechanism of the plurality of carriers being operative at other transfer points for shunting the individual carriers to different sidings subsequent to their group selection and transfer at a common transfer point.

5. In an automatic conveyer system, a plurality of independently traveling carriers, a circuitous track for the carriers, including main line and siding tracks, selective means including trip arms of different carriers located in differently spaced positions transversely of the path of travel and track located ramps also differently spaced transversely of the path of travel, in positions corresponding to those of such transversely spaced trip arms by which a predetermined group of said carriers are automatically transferred from the main line track to a branch track at a predetermined common transfer point, said selective mechanism being subsequently operative to automatically transfer the individual cars of the group at different sidings.

6. In an automatic conveyer system, a plurality of independently traveling carriers, a circuitous track for the carriers, including main line and siding tracks, separate sets of guiding means on the carriers engageable with the main line and siding track alternately, selective means for alternating the guiding means by which a predetermined group of said carriers are automatically transferred from the main line track to a branch track at a predetermined common transfer point, said selective mechanism being subsequently operative to automatically transfer the individual cars of the group at different sidings, and a siding common to all of the cars of the system at which the selective mechanism is operative to transfer the cars comprising a plurality of such groups and individual cars.

7. In an automatic conveyer, a plurality of independently traveling carriers, a track system including main line and siding tracks, selective mechanism on each carrier including mechanically actuated trip arms on different carriers differently positioned transversely of the path of travel, and correspondingly located track ramps for engagement with said trip arms, for automatically transferring the carriers from the main line track to sidings at different predetermined transfer points and automatically operated means for effecting the retransfer of each carrier from the particular siding to the main line track.

8. In an automatic conveyer system, a plurality of independently traveling carriers each provided with alternating sets of carrying wheels, a track system including main line track and sidings, selective mechanism, for automatically alternating the carriage wheels to transfer the carriers from the main line track to sidings at predetermined transfer points, and trip means operative at the exit from each siding and common to a plurality of carriers of the system for again alternating the carrying wheels for retransferring such carriers from the siding to the main line track.

9. In an automatic conveyer system, a plurality of independently traveling carriers, a track system including main line track and sidings, selective mechanism for automatically transferring the carriers from the main line track to sidings at predetermined transfer points, and means for rendering the transfer mechanism ineffective when a predetermined number of carriers have been transferred to a particular siding.

10. In an automatic conveyer system, a plurality of independently traveling carriers, a track system including main line track and sidings, selective mechanism for automatically transferring the carriers from the main line track to sidings at predetermined transfer points, and carrier operated means for rendering the selective mechanism of certain subsequent carriers inoperative whereby the number of cars admitted to a particular siding is limited regardless of the selective mechanism on other cars normally operative for transferring to that particular siding.

11. In an automatic conveyer system, a plurality of independently traveling carriers, a track system including main line track and sidings, selective mechanism for automatically transferring the carriers from the main line track to sidings at predetermined transfer points, and carrier operated means actuated by carriers entering a siding for bypassing the carriers past a particular siding when such siding contains a predetermined number of carriers.

12. In an automatic conveyer system, a plurality of independently traveling carriers, a track system including main line track and sidings, selective mechanism for automatically transferring the carriers from the main line track to sidings at predetermined transfer points, and car operated means for limiting the number of carriers admitted to the same siding to a predetermined number.

13. In an automatic conveyer system, a plurality of independently traveling carriers, a track system including main line track and sidings, selective mechanism for automatically transferring the carriers from the main line track to sidings at predetermined transfer points, and regulating means for limiting the number of cars permitted to enter a given siding, automatically actuated by cars entering the siding, and means for automatically restoring said regulating means to admit additional carriers by carriers leaving the siding.

14. In an automatic conveyer system, a plurality of independently traveling carriers, a track system including main line track and sidings, selective mechanism for automatically transferring the carriers from the main line track to sidings at predetermined transfer points, and regulating mechanism for limiting the number of carriers admitted to a siding actuated through a step by step movement by successive carriers entering the siding, and restored through a step by step movement by carriers leaving the siding.

15. In an automatic conveyer system, a plurality of independently traveling carriers, a track system including main line and siding tracks, selective mechanism for automatically transferring the carriers from the main line track to different sidings at predetermined transfer points, and carrier detent means controlled by a carrier on the main line track for preventing the escape of a carrier from a siding while a second carrier is within a prescribed range upon the main line track to prevent interference.

16. In an automatic conveyer system, a plurality of independently traveling carriers, a track system including main line and siding tracks, selective mechanism for automatically transferring the carriers from the main line track to different sidings at predetermined transfer points, a detent for preventing the return of a carrier from a siding to the main line track, detent setting means operated by the approach of a carrier upon the main line track within interfering range, and detent releasing means operative upon the passage of the car upon the main line track beyond the range of interference with a car emerging from the siding.

17. In an automatic conveyer system, a plurality of independently traveling carriers, a track system including main line and siding tracks, selective mechanism for automatically transferring the carriers from the main line track to different sidings at predetermined transfer points, and carrier controlled means for preventing the escape of a carrier from a siding during the travel of a second carrier upon the main line track within a range of possible interference.

18. In an automatic conveyer system, a plurality of independently electrically propelled traveling carriers, a track system including main line and siding tracks, retractable sets of guiding means on the carriers and engageable with the main line and siding tracks alternately, selective mechanism alternating said sets of guiding means for automatically transferring the carriers from the main line track to different sidings at predetermined transfer points, a local electrical power circuit on each carrier, a switch in said circuit, and means for automatically opening said circuit switch for disconnecting the propelling power from a carrier upon its entrance to a siding.

19. In an automatic conveyer system, a plurality of independently traveling carriers, a track system including main line and siding tracks, retractable sets of guiding means on the carriers and engageable with the main line and siding tracks alternately, selective mechanism alternating said sets of guiding means for automatically transferring the carriers from the main line track to different sidings at predetermined transfer points, an independent electrical propulsion system for each carrier, an electrical switch controlling such individual electrical propelling system, and switch operating means for automatically opening the switch upon the entrance of a carrier onto a siding.

20. In an automatic transportation system of the character described, including main track and sidings and traveling carriers movable thereover, alternating sets of guide devices operatively engaging the main line tracks and the siding tracks respectively, means for retracting each set of guide devices when the other set is engaged with its corresponding track, and selective means for automatically alternating the sets of guide devices at predetermined points in the path of travel of the carriers.

21. In an automatic conveyer system, a plurality of independently traveling carriers, a track system including main line and siding tracks, selective mechanism for automatically transferring the carriers from the main line track to different sidings at predetermined transfer points, means for automatically limiting the cars admitted to a particular siding to a predetermined number, and means for automatically thereafter admitting additional carriers to such siding in direct ratio to those discharged from the particular siding.

22. In an automatic conveyer system, a plurality of independently traveling carriers, a track system including main line and siding tracks, selective mechanism for automatically transferring the carriers from the main line track to different sidings at predetermined transfer points, and automatic stop means for limiting the carriers admitted to a particular siding, advanced through a step by step movement toward its operative stage by the entrance of successive carriers to the particular siding and automatically retracted from its operative stage through step by step movement by the escape of carriers from the siding.

23. In an automatic conveyer, a plurality of independently traveling carriers, a track system including main line track and sidings, selective mechanism for automatically transferring the carriers from the main line track to sidings at predetermined transfer points, means for preventing the entrance of another carrier to a siding when such siding is occupied and means operated by the escape of a carrier from the siding for retracting the said limiting means to permit the entrance of an additional car to such siding.

24. In an automatic conveyer, a plurality of independently traveling carriers, a track system including main line track and sidings, selective mechanism for automatically transferring the carriers from the main line track to sidings at predetermined transfer points, and means for temporarily preventing the return of a carrier from a siding to the main track automatically controlled by the passing of a carrier on the main track.

25. In an automatic transportation system of the character described, including main line tracks and siding tracks the entrances and exits of the siding tracks being relatively fixed in relation with the main line tracks, a series of traveling carriers movable over the main line and siding tracks, retractable sets of guiding devices carried by the carriers, one set being operatively engageable with the main line tracks and the other with the siding tracks, actuating means therefor and track located trips adjacent to entrances and exits of sidings for effecting the retraction of one set of guiding devices and the operative engagement of another set thereof with the corresponding track.

26. In an automatic conveyer, a plurality of independently traveling carriers, a track system including main line track and sidings, the sidings terminating in track extensions extending in fixed relation with the main line track, two sets of carrying wheels for each carrier movable relative one to another into and out of engagement with the main line track and siding track respectively, propelling means for the carrier common to both sets of carrying wheels, and selective mechanism for automatically raising and lowering the respective sets of carrying wheels at predetermined transfer points by which the side track carrying wheels will be lowered into operative position and the main line track wheels retracted and vice versa.

27. In an automatic conveyer, a plurality of independently traveling carriers, a track system including main line track and sidings, the sidings terminating in track extensions extending in fixed parallel relation with the main line track, two sets of carrying wheels for each carrier movable into and out of engagement with the main line track and siding track respectively, swinging carriers for said wheels, and actuating means common to the swinging carriers by which one set of wheels will be lowered to operative position and the other set of wheels subsequently elevated.

28. In an automatic conveyer, a plurality of independently traveling carriers, a track system including main line track and sidings, the sidings terminating in track extensions extending in fixed parallel relation with the main line track, two sets of carrying wheels for each carrier movable into and out of engagement with the main line track and siding track respectively, actuating mechanism for raising and lowering the sets of carrying wheels alternately, there being a momentary interval between the lowering of one set and the elevation of the other during which both sets of wheels are in lowered position and in engagement simultaneously with the main line track and the parallel extension of the siding.

29. In an automatic conveyer, a plurality of independently traveling carriers, a track system including main line track and sidings, the sidings terminating in track extensions extending in fixed parallel relation with the main line track, two sets of carrying wheels for each carrier movable into and out of engagement with the main line track and siding track respectively, movable supports for said sets of carrying wheels oscillatory cam plates controlling said supports and means for effecting the oscillation of the cam plates at predetermined points in the path of travel of the carriers, said cam plates being adapted upon oscillation to lower one set of carrying wheels of each carrier and retract the other set of carrying wheels.

30. In an automatic conveyer, a plurality of independently traveling carriers, a track system including main line track and sidings, the sidings terminating in track extensions extending in fixed parallel relation with the main line track, two sets of carrying wheels for each carrier movable into and out of engagement with the main line track and siding track respectively, movable supports for said sets of carrying wheels, oscillatory cam plates controlling said supports and means for effecting the oscillation of the cam plates at predetermined points in the path of travel of the carriers, said cam plates being adapted upon oscillation to lower the set of carrying wheels of each carrier and retract the other set of carrying wheels, the actuating cam surfaces having therein neutral portions by which both sets of carrying wheels are momentarily maintained in lowered positions.

31. In an automatic conveyer, a plurality of independently traveling carriers, a monorail track system, including main line track and sidings, and an elevated trolley guide, two alternately operable sets of carrying wheels and two alternately operable trolleys for each carrier, one set of carrying wheels and one trolley being operable upon the main line track and the other set of carrying wheels and trolley being operable upon a side track, and means for automatically alternating the carrying wheels and trolleys at predetermined transfer points.

32. In an automatic conveyer, a plurality of independently propelled carriers, a monorail track system including main line track and sidings, an elevated trolley guide including main line and siding portions, carrying wheels and trolleys operable upon the main line track and other carrying wheels and trolleys operable upon the sidings, and means for alternating the carrying wheels and trolleys in unison.

33. In an automatic conveyer, a self propelled carrier, a monorail system including main line track and sidings, and an elevated trolley guide with side track portions, said track sidings and trolley guide portions having extensions extending in substantially parallel fixed relation with the main line track, two sets of retractable carrying wheels and two retractable trolleys carried by the traveling carriers and means for alternating the trolleys and carrying wheels into and out of engagement with the fixed parallel portions of the main line and siding tracks and trolley guides.

34. In an automatic conveyer, a traveling carrier, a track system including main line track and sidings, means for automatically transferring the carrier from the main line track and siding track, and vice versa including alternately operable sets of carrying wheels movably mounted on the carrier and adjustable selective mechanism mounted upon the carrier for relatively adjusting the sets of carrying wheels by which the transfer from the main line to a siding track may be effected automatically at any predetermined one of a number of transfer points throughout the system.

35. In an automatic conveyer, a traveling carrier, a track system including main line track and sidings, means for automatically transferring the carrier from the main line track to the siding track including alternately operable sets of carrying wheels, and actuating means for said carrier transfer means including an oscillatory trip arm and a track positioned trip engaged thereby by which the sets of carrying wheels are alternately raised and lowered out of and into engagement with the track.

36. In an automatic conveyer, a traveling carrier, a track system, including a main line track and sidings, mechanism for automatically transferring the carrier from the main line track to a siding means controlling the operation of the transfer mechanism including a movable trip arm, a coupling member normally out of operative position whereby the trip arm is permitted to operate idly, and means for adjusting said coupling member into operative position for operation of the transfer mechanism by the action of the trip arm.

37. In an automatic conveyer, a traveling carrier, a track system including a main line track and sidings, mechanism for automatically transferring the carrier from the main line track to a siding, and selective means for effecting the transfer at a predetermined point, including a series of track located trips, and a plurality of trip arms upon the carrier for engagement with the track located trips, and means for transmitting motion to the transfer mechanism, necessitating the operation of a predetermined number of said plurality of trip arms to effect the transfer of the carrier.

38. In an automatic conveyer, a traveling carrier, a track system including a main line track and sidings, mechanism for automatically transferring the carrier from the main line track to a siding, and selective means for effecting the transfer at a predetermined point, including a series of track located trips, and a plurality of trip arms upon the carrier for engagement with the track located trips, and means for transmitting motion to the transfer mechanism, necessitating the operation of the plurality of trip arms in predetermined sequence to effect the transfer of the carrier.

39. In an automatic conveyer, a traveling carrier, a track system including a main line track and sidings, mechanism for automatically transferring the carrier from the main line track to the sidings including alternating sets of carrying wheels relatively movable in relation with each other, selective means for effecting such transfer at a predetermined point by raising one set of carrying wheels and lowering another set, including track located means for setting the transfer mechanism in condition for operative movement, when the carrier reaches a predetermined point.

40. In an automatic conveyer, a traveling carrier, a track system including a main line track and sidings, mechanism for automatically transferring the carrier from the main line track to the sidings, selective means for effecting such transfer at a predetermined point, a reciprocatory link, an oscillatory actuating arm for said link, a setting lever normally maintaining the link and actuating arm in inoperative relation, and track located means for initially operating the setting lever to relatively adjust the link and actuating arm to operative relation and upon further advance of the carrier operate the actuating lever to effect the transfer of the carrier.

41. In an automatic conveyer, a traveling carrier, a track system including a main line track and sidings, mechanism for automatically transferring the carrier from the main line track to the sidings, selective means for effecting such transfer at a predetermined point, a setting member and an actuating member for the transfer mechanism, track located means for operating the setting member to condition the transfer mechanism and upon further advance of the car for effecting the actuation of the transfer mechanism to transfer the carrier from one track to the other.

42. In an automatic conveyer, a traveling carrier, a track system including a main line track and sidings, mechanism for automatically transferring the carrier from the main line track to the sidings, selective means for effecting such transfer at a predetermined point, and retransfer means common to all the transfer points and automatically actuated as a carrier leaves a siding for retransferring the carrier back to the main line track.

43. In an automatic conveyer, a traveling carrier, a track system including a main line track and sidings, mechanism for automatically transferring the carrier from the main line track to the sidings, selective means for effecting such transfer at a predetermined point, a restoring member, and track located trips at the outlets from the different sidings with which the restoring member engages to retransfer the carrier to the main line track.

44. In an automatic conveyer, a traveling carrier, a track system including main line track and sidings, mechanism for automatically transferring the carrier from the main line track to a siding, said sidings being elevated above the level of the main line track, and inclined outlets from said elevated sidings down which the traveling carriers return to the main line track under influence of gravity independent of their normal propulsion means and means controlled by the travel of other carriers on the main track for controlling the escape of carriers from the siding.

45. In an automatic conveyer, a plurality of traveling carriers, a track system including main line track and sidings, selectively controlled means for automatically transferring the carriers from the main line track to predetermined sidings, and means operated by advance carriers for rendering the selective transfer mechanism of following carriers destined for a particular siding inoperative when a predetermined number of carriers are contained upon the particular siding.

46. In an automatic conveyer, a plurality of traveling carriers, a track system including main line track and sidings, selectively controlled means for automatically transferring the carriers from the main line track to predetermined sidings, track located trip means for effecting the operation of the transfer mechanism, and means for automatically retracting the trip means from operative position when a predetermined number of carriers are contained upon the corresponding siding.

47. In an automatic conveyer, a plurality of traveling carriers, a track system including main line track and sidings, selectively controlled mechanism for automatically transferring the carriers from the main line track to predetermined sidings, track located trip means for actuating the transfer mechanism, said trip being retractable to an inoperative position, and step by step control mechanism for said retractable trip means actuated by the entrance of successive cars onto the siding whereby the trip is retracted and succeeding carriers allowed to pass without transfer when a predetermined number of carriers have entered the siding.

48. In an automatic conveyer, a plurality of traveling carriers, a track system including main line track and sidings, selectively controlled mechanism for automatically transferring the carriers from the main line track to predetermined sidings, track located trip means for actuating the transfer mechanism, a stop member normally retaining the trip in operative position but adapted when moved to a predetermined position to release the trip for retraction, means operated by carriers entering upon a siding for actuating such stop member through step by step movement toward releasing position and means actuated by carriers leaving the siding for retracting the stop member through step by step movement from such release position.

49. In an automatic conveyer, a plurality of traveling carriers, a track system including main line track and sidings, selectively controlled mechanism for automatically transferring the carriers from the main line track to predetermined sidings, and control means for each siding intermittently actuated through successive steps in either direction by carriers entering and leaving the siding, said control means being advanced to release position by carriers entering the siding, wherein the transfer mechanism is rendered ineffective, and retracted from such release position by carriers leaving the siding, thereby limiting to predetermined number the carriers contained upon a given siding at the same time.

50. In a conveyer system, a plurality of traveling carriers, a track system including main line track and sidings, selectively controlled mechanism for automatically transferring the carriers from the main line track to predetermined sidings, a retractable trip member for each siding, a member for controlling the operation of the transferring mechanism, and movable successively in one direction by carriers entering upon a siding and movable successively in the opposite direction by carriers leaving the siding, said control member when moved to predetermined position by preponderance of carriers entering the siding acting to render the transfer mechanism inoperative to transfer additional carriers.

51. In a railway system, a depressible ramp, a support for normally supporting the ramp in its elevated position, carrier actuated means for actuating the ramp support in opposite directions in accordance with predetermined movement of the carriers, the movement of the support to an extreme position in one direction by preponderance of carrier operations of one sort acting to release the ramp for depression and movement of the support in the other direction serving to restore the ramp and thereafter postpone its depression under adverse operations.

52. In a railway system, a depressible ramp, an oscillatory support for the ramp permitting the retraction of the ramp when the support is oscillated to a predetermined position, a pair of oppositely disposed ratchet members controlling the movement of the support, one of said ratchet members being adapted to effect the movement of the ramp support in one direction and the other effecting its movement in the opposite direction and means for independently operating the ratchet member through step by step movement by the movement of traffic upon said railway whereby the preponderance of step by step movements of one ratchet member in excess of those of the other will withdraw the support from said ramp and permit its depression.

53. In a railway system, a depressible ramp, an oscillatory member normally supporting the ramp in operative position, a pair of oppositely arranged ratchet members, traffic operated pawls for each ratchet member, a differential gear train including two gear pinions each operatively engaged with one of said ratchet members, an intermediate gear pinion carried by the oscillatory support, and means for independently actuating the ratchet members by the movement of traffic upon the railway to move the support member toward and from the point of release of the ramp whereby the preponderance of step by step movements of one ratchet member in excess of those of the other will withdraw the support from said ramp and permit its depression.

54. In an automatic conveyer, a plurality of traveling carriers, a track system including a main line track and sidings, a carrier detent for preventing the escape of a carrier from a siding to the main line track, and means operated by a carrier passing upon the main line track for temporarily maintaining the detent on locking position.

55. In an automatic conveyer, a plurality of traveling carriers, a track system including a main line track and sidings, a carrier detent for preventing the escape of a carrier from a siding to the main line track, means for locking said detent in carrier detaining position, a trip member engaged by a carrier traversing the main line track for locking the detent, and a second trip member in spaced relation with the first mentioned trip member for disengaging the detent locking means upon the passage of a carrier.

56. In an automatic conveyer, a plurality of traveling carriers, a track system including a main line track and sidings, a carrier detent for preventing the escape of a carrier from a siding to the main line track, locking means for the detent and control means for said detent lock engaged by a carrier traversing the main line track and held in its operative position throughout an extended path of travel of said traveling carrier to prevent the escape of a carrier from the siding until the main line carrier has passed beyond a predetermined zone of possible interference.

57. In an automatic conveyer, a plurality of traveling carriers, a track system including a main line track and sidings, a carrier detent for preventing the escape of a carrier from a siding to the main line track, a lock for said detent, control means for said detent lock operated by a passing carrier upon the main line track, and a yielding connection between said carrier operated control means and the detent lock whereby the control means may be actuated to set the detent locking means in operative condition in advance of the locking engagement thereof.

58. In an automatic conveyer, a plurality of traveling carriers, a track system including a main line track and sidings, a carrier detent for preventing the escape of a carrier from a siding to the main line track, a locking means for said detent, a swinging bar mounted for parallel swinging movement and normally extending into the path of travel of carriers upon the main line track, and displaced therefrom the engagement of such carriers, and an operative connection between the parallel bar and the detent lock by which the latter is maintained in operative engagement as long as the bar is held in displaced position by passing carriers.

59. In an automatic conveyer, a plurality of traveling carriers, a track system including a main line track and sidings, a carrier detent for preventing the escape of a carrier from a siding to the main line track, a pivoted locking member movable into and out of engagement with the carrier detent a trip member extending into the path of travel of carriers upon the main line track, an operative connection between the trip member and the oscillatory locking arm, including a tension spring, the resistance of which is sufficient to actuate the locking lever without yielding under normal conditions, said spring yielding to abnormal resistance of the locking member to prevent breakage.

In testimony whereof, I have hereunto set my hand this 9th day of February, A. D. 1924.

WILLIAM H. ROBERTSON.